United States Patent [19]

Connolly, Jr.

[11] Patent Number: 5,002,093
[45] Date of Patent: Mar. 26, 1991

[54] REPAIR PATCH FOR TUBULAR FLUID-CONTAINING VESSEL

[76] Inventor: Thomas Connolly, Jr., 102 Wayne St., Jericho, N.Y. 11753

[21] Appl. No.: 410,683

[22] Filed: Sep. 21, 1989

[51] Int. Cl.⁵ .............................................. F16L 55/16
[52] U.S. Cl. ........................................ 138/99; 138/98; 138/97; 24/279
[58] Field of Search .................. 138/99, 98; 428/63

[56] References Cited

U.S. PATENT DOCUMENTS

| | | | |
|---|---|---|---|
| 2,443,271 | 6/1948 | Russell | 138/99 |
| 3,574,313 | 4/1971 | Tanaka | 138/99 |
| 4,424,246 | 1/1984 | Pieslak et al. | 138/99 |

FOREIGN PATENT DOCUMENTS 389118  8/1922  Fed. Rep. of Germany ........ 138/99

*Primary Examiner*—Philip R. Coe
*Assistant Examiner*—Patrick Brinson
*Attorney, Agent, or Firm*—Nolte, Nolte and Hunter

[57] ABSTRACT

Method and apparatus for repair of a tubular fluid-containing vessel such as a pipe or hose. A repair patch includes a sheet of heat-shrinkable material and take-up means for tightly securing the sheet to itself around the pipe or hose. The method includes placing the sheet of heat-shrinkable material around the tubular vessel, taking up the two ends of the sheet relative to each other until the sheet is wrapped snugly around the pipe or tube, and applying heat to the heat-shrinkable sheet to shrink the sheet tightly around the pipe or hose and seal the leak.

7 Claims, 2 Drawing Sheets

REPAIR PATCH FOR TUBULAR FLUID-CONTAINING VESSEL

The present invention relates to a repair patch and method of using the same for tubular fluid-containing vessels. The patch is particularly adapted to repairing pipes and hoses, more particularly to hoses carrying coolant for internal combustion engines.

BACKGROUND OF INVENTION

Various devices have been proposed for making emergency repairs to pipe or tubing carrying a fluid under pressure to seal a ruptured area and prevent the escape of fluid therefrom without disrupting the normal flow of fluid through the pipe or tubing.

U.S. Pat. No. 3,480,043, issued on Nov. 25, 1969 to Proudfoot for an EMERGENCY LEAK CLAMP, refers to a resilient, inflatable pipe clamp which can be wrapped around a pipe in place, over a rupture in the pipe and while fluid is discharging therefrom, and inflated to stop such discharge of fluid.

Tosk, U.S. Pat. No. 2,462,504, issued Feb. 22, 1949 for a PIPE CLAMP.

Straus, U.S. Pat. No. 3,459,231, issued Aug. 5, 1969, refers to a clamp having a tensioning member and a saddle member that are attached to a pipe and circling band. The band is adapted to pull a gasket into sealing engagement with a leak in a pipe. The tensioning member and saddle member are pulled towards each other.

OBJECT OF THE INVENTION

It is an object of the present invention to provide a patch which may be wrapped around a tubular fluid-containing vessel such as a hose or pipe, in a location which may be difficult to access, and pulled snugly without the application of great physical force. It is a further object of this invention to tighten said patch, into a form-fitting and leak-proof tension and configuration, by applying heat to the patch.

SUMMARY OF INVENTION

The present invention comprises a sheet of heat-shrinkable material, preferably rectangular, to which is affixed a take-up means at one end. The take-up means preferably comprises a housing, an axle, rotationally mounted within the housing, and a slot in the axle for receiving the far end of the heat-shrinkable material. The preferred take-up means further comprises a pawl-and-ratchet and a thumb screw.

To patch a hose or other tubular vessel, the housing is located with the axle oriented in the longitudinal direction of the tube and with the attached end of the heat-shrinkable sheet located between the housing and the tube. The far end of the sheet is wrapped around the tubing so that an unbroken expanse of the sheet covers the leak to be repaired. The far end of the sheet is threaded through the slot in the axle by one hand. The other hand rotates the thumbscrew in a tightening direction, which is the only direction which the pawl allows the axle to be rotated in. By this means, the excess material of the heat-shrinkable sheet is taken up on the axle until the sheet is wrapped snugly around the hose.

Since a great deal of pressure is not required at this stage, it can be accomplished by the thumbscrew rotated by thumb and forefinger.

Heat is then applied to the heat-shrinkable material by a heat gun or, in the case of an internal combustion engine or other high temperature application, heat is provided by the passage of hot fluid through the vessel. Said heat shrinks the heat-shrinkable material until it conforms, without fluid-penetrable gaps, to the surface of the tubing.

When the heat-shrinkable material is sufficiently shrunk and conformed, the leak is thereby repaired.

BRIEF DESCRIPTION OF THE DRAWINGS

Turning now to the drawings, FIG. 1 shows the patch assembly generally designated 2. The assembly comprises a crank housing 4 which is attached to a strap of heat-shrink material 6. Crank 8 is mounted on side walls 9 and 10 of crank housing 4. Side walls 9-10 are joined by housing base 4b (FIG. 3). Strap 6 is receivable in slot 11. Thumb screw 12 is used to rotate crank 8 and wrap heat-shrink material 6 around the crank.

FIG. 2 shows pipe 20 in cross-section, including leak 22 through the pipe's wall. Strap 6 is wrapped loosely around pin 4a and secured to itself at bonded area 5. From pin 4a strap 6 is wrapped around pipe 20 to crank housing 4. As shown in FIG. 3, end 26 of strap 6 is threaded through slot 11 of crank 8. Returning to FIG. 2, thumb screw 12 is rotated and pawl 16 engages ratchet gear 14 to prevent back rotation of the crank. Thus strap 6 is taken up snugly around pipe 20. This is done until the strap is hand-tight.

Figure 1:
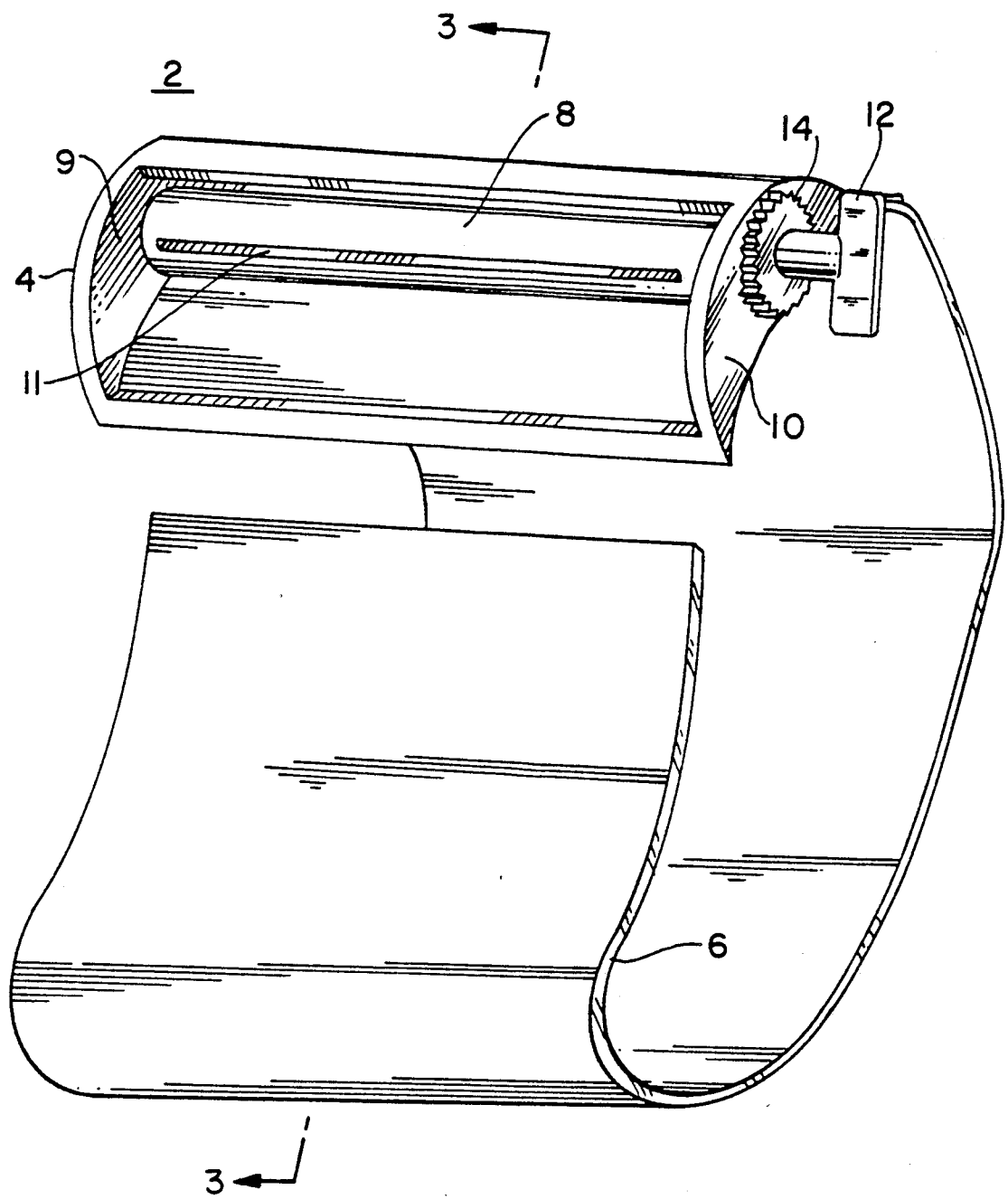
FIG. 1 is an oblique view of the repair patch.
Figure 2:
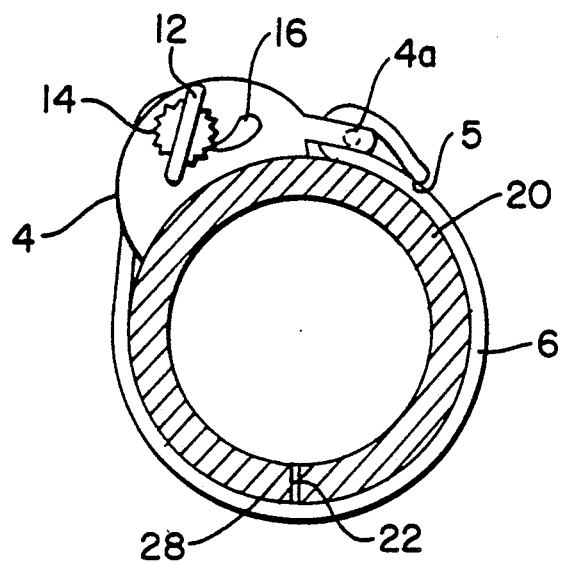
FIG. 2 shows an elevation, not in section, of the patch, showing it wrapped around a tube shown in section.
Figure 3:
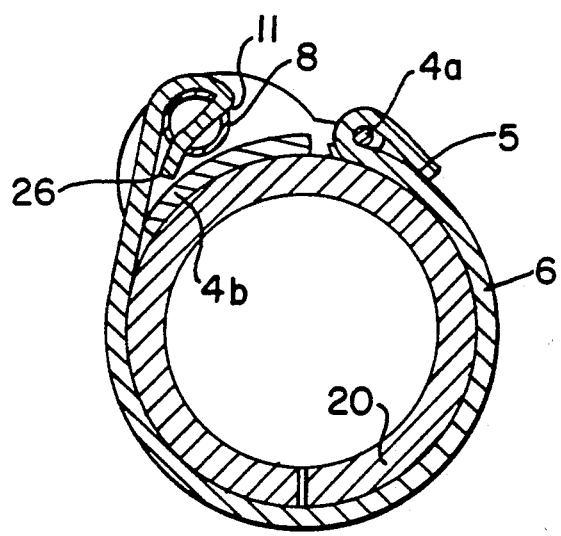
FIG. 3 shows said apparatus, in section through its center, along a plane indicated in FIG. 1 as 3.

Further tightening is accomplished by shrinking the heat-shrink material. Pawl 16 and ratchet 14 prevent the crank tension from being loosened while the heat shrinks the material and thus pulls the material very tightly around pipe 20. The shrinking material conforms very closely to the surface of pipe 20 so that leak 22 is completely sealed at outer pipe surface 28 between pipe 20 and heat shrink strap 6.

For purposes of these specifications and claims, a vacuum is defined as a fluid, and the words "fluid-containing" are defined to include "vacuum-containing".

I claim:

1. A repair patch for a tubular fluid-containing vessel comprising:
   sheet of heat-shrinkable material comprising means for sealably covering a leak in said fluid containing vessel; and
   take-up means for progressively mechanically tightening said sheet around said tubular vessel.

2. A repair patch for a tubular fluid-containing vessel, said patch comprising:
   repair means for covering and sealing a leak in said fluid containing vessel, including a sheet of heat-shrinkable material;
   a housing affixed at an end of said sheet to said sheet;
   axle means, mounted to said housing, for receiving an end of said sheet distal from the end to which the housing is mounted, and for winding up said distal end;
   ratchet means for restricting rotation of said axle to one direction; and thumb screw means for rotating said axle by hand for progressively mechanically tightening said sheet around said tubular vessel prior to heat shrinking.

3. Apparatus according to claim 2 in which the ratchet means comprises a ratchet gear and pawl.

4. Apparatus according to claim 2 in which the sheet of heat-shrinkable material is wrapped around a part of the crank housing and secured to itself.

5. A method of repairing leaks in fluid-containing tubular vessels, said method comprising the steps of:

first placing a sheet of heat-shrinkable material around the tubular vessel with an unbroken expanse of said sheet located over a leak;

next mechanically progressively taking up two ends of said sheet relative to each other in a tightening direction until said sheet is wrapped snugly around the tubular vessel; and next applying heat to said heat-shrinkable sheet to shrink said sheet tightly around said tubular vessels and seal the leak.

6. A method according to claim 5 in which heat is applied to heat-shrinkable material by a hot fluid normally contained within the vessel.

7. A repair patch for a tubular fluid-containing vessel comprising:

sheet of heat-shrinkable material; and take-up means for tightly securing said sheet around the tubular vessel by progressively mechanically tightening said sheet around said tubular vessel, said take-up means comprising:

a housing, an axle mounted on said housing;

a ratchet gear mounted to said axle;

a pawl on said housing for engaging said ratchet gear; and means for attaching the ends of said material to said housing and axle.

* * * * *